(Model.)
R. D. WHITTEMORE.
HARNESS LOOP AND TRACE CARRIER.
No. 248,819. Patented Oct. 25, 1881.
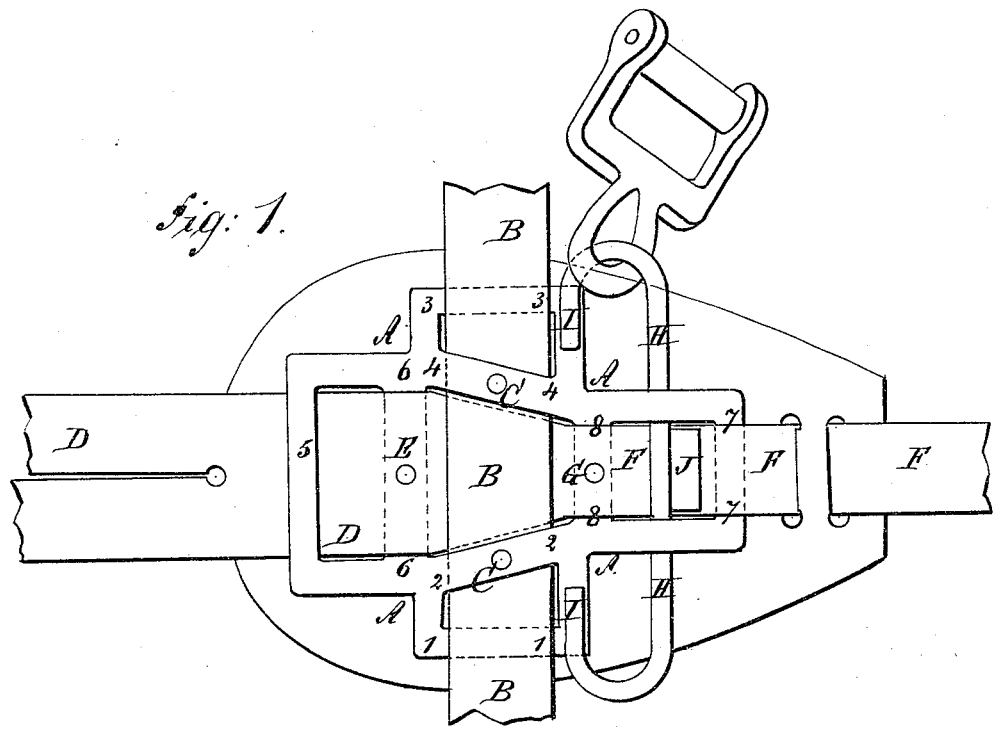
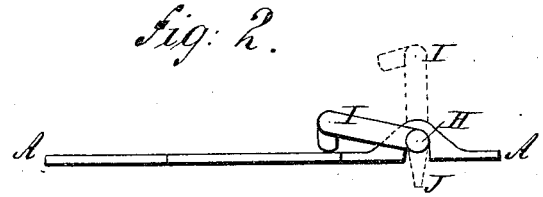
WITNESSES:
A. Schohl.
C. Sedgwick
INVENTOR:
R. D. Whittemore
BY Munn & Co
ATTORNEYS.

UNITED STATES PATENT OFFICE.

ROBERT D. WHITTEMORE, OF CHIPPEWA FALLS, WISCONSIN.

HARNESS-LOOP AND TRACE-CARRIER.

SPECIFICATION forming part of Letters Patent No. 248,819, dated October 25, 1881.

Application filed April 16, 1881. (Model.)

*To all whom it may concern:*

Be it known that I, ROBERT D. WHITTEMORE, of Chippewa Falls, in the county of Chippewa and State of Wisconsin, have invented a new and useful Improvement in Combined Harness-Loops and Trace-Carriers, of which the following is a full, clear, and exact description.

Figure 1 is a plan view of my improvement. Fig. 2 is a side elevation of the same.

The object of this invention is to facilitate and cheapen the manufacture of harness and provide a convenient means for carrying the traces.

The invention consists in constructing a combined harness-loop and trace-carrier with a loop or frame having outer and inner bars upon the front, rear, and side parts to receive the harness-straps, projecting pins upon its inner bars to hold the harness-straps in place, and a rod having hooks formed upon its ends and a projection upon its middle part, whereby the cockeyes of the traces can be received and held, as will be hereinafter fully described.

A represents the harness loop or frame for connecting the hip-strap, the back-strap, and the crupper-strap.

B represents the hip-strap, which is passed over the outer bars, 1 3, and under the inner bars, 2 4, at the sides of the loop or frame A, and is kept in place by downwardly-projecting pins C, attached to the inner bars, 2 4.

The crupper-strap D is passed under an outer bar, 5, over an inner bar, 6, and under the hip-strap B, and is kept in place by an upwardly-projecting pin, E, attached to the inner bar, 6.

The back-strap F is passed over both the outer bar, 7, and the inner bar, 8, and under the hip-strap B, and is kept in place by an upwardly-projecting pin, G, attached to the inner bar, 8.

The side bars of the forward part of the loop or frame A have an upward projection or swell formed in them, which is recessed from the lower side of the said bars to receive the rod H. The rod H is kept in place by the back-strap F, which passes beneath it. The end parts, I, of the rod H are bent into U or hook form, and their ends are slightly bent or twisted downward to rest upon the side parts of the loop or frame A, as shown in Figs. 1 and 2. Upon the middle part of the rod H, and directly opposite the bends or hooks I, at its ends, is formed a projection or plate, J, the side of which, when the ends of the hooks I rest upon the bars of the loop or frame A, bear against the upper side of the back-strap F.

When the trace-carrier is to be used the cockeye of the trace is pressed in between the hook I and the frame A, so as to raise the said hook and pass over its end. The rise of the hooks I causes the projection J to press the back-strap F downward between the bars 7 8. As the cockeye passes over the hook I the pressure of the back-strap F against the projection J forces the ends of the hooks I down against the loop or frame A and holds them there, so that the cockeyes cannot become accidentally detached, however the harness may be handled.

When the cockeye is to be detached it is turned to bring the lower bar of its loop against the lower side of the hook I, toward its point, and its upper bar against the upper side of the hook I, toward the body of the rod H. A slight twist of the cockeye will then raise the point of the hook I, so that the said cockeye can be easily slipped off the said hook.

With this construction the trace-carrier has no projecting parts for the reins to catch upon.

With this construction, also, the trace-carrier can be readily attached and detached by detaching the back-strap F from the loop or frame A.

Having thus fully described my invention, what I claim as new, and desire to secure by Letters Patent, is—

1. A combined harness-loop and trace-carrier constructed substantially as herein shown and described, consisting of the loop or frame A, having the outer bars, 1 3 5 7, the inner bars, 2 4 6 8, the downwardly-projecting pins C C and the upwardly-projecting pins E G, and the trace-carrier H I J, as set forth.

2. The combination, with a hip, crupper, and back strap frame having upward projections or swells recessed on the lower side, of a trace-carrier having a median projection, J, on the side opposite that on which the hooks are situated, as shown and described.

ROBERT DOANE WHITTEMORE.

Witnesses:
 ED H. COLEMAN,
 L. M. NEWMAN.